United States Patent
Lo

(10) Patent No.: US 9,066,083 B2
(45) Date of Patent: *Jun. 23, 2015

(54) SINGLE LENS 2D/3D DIGITAL CAMERA

(71) Applicant: 3DV Co., Ltd., Chai Wan (HK)

(72) Inventor: Allen Kwok Wah Lo, Hong Kong (CN)

(73) Assignee: 3DV Co., Ltd., Chai Wan, Hong Kong (CN)

( * ) Notice: Subject to any disclaimer, the term of this patent is extended or adjusted under 35 U.S.C. 154(b) by 313 days.

This patent is subject to a terminal disclaimer.

(21) Appl. No.: 13/736,178

(22) Filed: Jan. 8, 2013

(65) Prior Publication Data

US 2013/0120537 A1 May 16, 2013

Related U.S. Application Data

(63) Continuation of application No. 12/798,775, filed on Apr. 9, 2010, now Pat. No. 8,363,156.

(51) Int. Cl.
*G03B 35/14* (2006.01)
*G02B 27/22* (2006.01)
*H04N 13/02* (2006.01)
*G03B 35/04* (2006.01)

(52) U.S. Cl.
CPC ............... *H04N 13/02* (2013.01); *G03B 35/04* (2013.01); *H04N 13/021* (2013.01)

(58) Field of Classification Search
USPC .............................................. 348/362, 49–50
See application file for complete search history.

(56) References Cited

U.S. PATENT DOCUMENTS

| | | | |
|---|---|---|---|
| 4,124,291 A | 11/1978 | Lo et al. | |
| 4,887,104 A * | 12/1989 | Kitano et al. | 359/246 |
| 5,471,237 A | 11/1995 | Shipp | |
| 5,680,171 A | 10/1997 | Lo et al. | |
| 5,727,242 A | 3/1998 | Lo et al. | |
| 5,745,163 A | 4/1998 | Nakamura et al. | |
| 5,802,410 A * | 9/1998 | Wah Lo et al. | 396/330 |
| 5,828,487 A | 10/1998 | Greening et al. | |
| 6,275,335 B1 | 8/2001 | Costales | |
| 6,624,935 B2 | 9/2003 | Weissman et al. | |
| 6,807,295 B1 | 10/2004 | Ono | |
| 7,019,780 B1 | 3/2006 | Takeuchi et al. | |
| 7,061,532 B2 | 6/2006 | Silverstein | |
| 8,363,156 B2 * | 1/2013 | Lo | 348/362 |
| 2002/0008907 A1 | 1/2002 | Yamamoto | |
| 2002/0009299 A1 | 1/2002 | Lipton | |
| 2005/0140820 A1 | 6/2005 | Takeuchi et al. | |

* cited by examiner

Primary Examiner — Roberto Velez
Assistant Examiner — Tuan Le
(74) Attorney, Agent, or Firm — Ware, Fressola, Maguire & Barber LLP

(57) ABSTRACT

A single-lens 2D/3D camera has a light valve placed in relationship to a lens module to control the light beam received by the lens module for forming an image on an image sensor. The light valve has a light valve area positioned in a path of the light beam. The light valve has two or more clearable sections such that only one section is made clear to allow part of the light beam to pass through. By separately making clear different sections on the light valve, a number of images as viewed through slightly different angles can be captured. The clearable sections include a right section and a left section so that the captured images can be used to produce 3D pictures or displays. The clearable sections also include a middle section so that the camera can be used as a 2D camera.

20 Claims, 12 Drawing Sheets

SINGLE LENS 2D/3D DIGITAL CAMERA

FIELD OF THE INVENTION

The present invention generally relates to a digital camera and, more specifically, to a digital camera that can be used to take 2D or 3D video sequences.

BACKGROUND OF THE INVENTION

It is known that, in order to see a 3D image, each of a viewer's eyes must see a slightly different view of the same scene. To produce an image of different views, it generally requires taking two or more pictures at slightly different vantage points. The pictures taken at different vantage points or angles will provide the parallax necessary to create the three dimensional effect. It is possible to take two pictures at slightly different vantage points by using two imaging lenses in a camera, to form two separate images on two image sensors, or on different areas of a photograph film as shown in FIG. 1.

In a 3D still image, two or more pictures taken at different angles are processed into a composite image in which the pictures are printed or displayed in an interleaved fashion. A parallax separation device is then placed in front of the composite image to separate the different views and present them to a viewer's eyes. The parallax separation device can be a lenticular screen or a parallax barrier panel. A 3D video or movie can be presented in a similar fashion in that a series of composite images are displayed separately and sequentially. Alternately, a series of left and right views are presented alternately and sequentially, and a viewer is required to wear a pair of special glasses to see the different views. The glass lenses are open and closed in synchronicity with the image presentation. Currently, other 3D presentation techniques such as polarization separation and red/cyan anaglyphic lenses are also used.

When two or more imaging lenses are used to take pictures of a scene so that the images are used in making a 3D picture, for example, the lenses must be calibrated and adjusted so that the optical properties, such as magnification, focal point and spatial aberration of one of lenses are substantially identical to the optical properties of the other. It is advantageous to provide a different method and apparatus for producing a series of images from different views.

SUMMARY OF THE INVENTION

In a camera, according to various embodiments of the present invention, a light valve is placed in relationship to a lens module to control the light beam received by the lens module for forming an image on an image sensor. The light valve has a light valve area positioned in a path of the light beam. The light valve has two or more clearable sections such that only one section is made clear to allow part of the light beam to pass through. By separately making clear different sections on the light valve, a number of images as viewed through slightly different angles can be captured. The clearable sections include a right section and a left section so that the captured images can be used to produce 3D pictures or displays. The clearable sections also include a middle section so that the camera can be used as a 2D camera.

Thus, the first aspect of the present invention is a camera comprising:

a lens module having a focal plane, the lens module configured for receiving an incoming light beam for forming an image at the focal plane;

an image sensor located substantially at the focal plane for sensing the image, the image sensor configured for providing electrical signal indicative of the image to a storage device; and a light valve located in relationship to the lens module, the light valve comprising a valve area positioned in a path of the light beam, wherein the light valve is operable at least in a first state and in a second state, the light valve area is patterned such that when the light valve is operated in the first state, a first section of the light valve area is clear while the light valve area outside the first section is opaque so as to allow only a part of the light beam to reach the image sensor through the first section to form a first image on the image sensor, and when the light valve is operated in a second state, a different second section of the light valve area is clear while the light valve area outside the second section is opaque so as to allow a different part of the light beam to reach the image sensor to form a second image.

When the light valve is operated in the first state and the second state in an alternate fashion in a time cycle, the image sensor is caused to provide the electrical signal to the storage device in the time cycle so as to allow the storage device to record a series of recorded images representative of the first and second images in the alternate fashion.

According to the present invention, the light valve is also operable in a third state such that a third section of the light valve area is clear while the light area outside the third section is opaque so as to allow only a part of the light beam to reach the image sensor through the third section to form a third image on the image sensor, the third section located between the first section and the second section.

According to one embodiment of the present invention, the light valve is a liquid crystal device. The light valve can be located between the lens module and the image sensor, or in front of the lens module. In a lens module that has a first lens sub-module and a second lens sub-module along an optical axis spaced from the first lens sub-module, the light valve can be located between the first lens sub-module and the second lens sub-module.

According to the present invention, the camera also comprises a controller for providing a timing signal; and a light-valve driver, responsive to the timing signal, for applying the electric field on the electro-optical material, the image sensor providing the electrical signal also based on the timing signal.

According to the present invention, the camera can be used in a 2D mode or a 3D mode. The camera can be used to take a single 2D picture or a single pair of 3D images. The camera can also be used to take a series of 2D pictures or a sequence of 3D image pairs. Thus, the camera also has a user interface to allow a user to select a picture taking mode.

Furthermore, the camera can be used to take pictures in a horizontal mode or a vertical mode.

The second aspect of the present invention is a method for use in a camera that has a lens module having a focal plane, the lens module configured for receiving an incoming light beam for forming an image at the focal plane; and an image sensor located substantially at the focal plane for sensing the image, the image sensor configured for providing electrical signal indicative of the image to a storage device. The method comprises:

disposing a light valve located in relationship to the lens module, the light valve comprising a valve area positioned in a path of the light beam, wherein the light valve is operable at least in a first state and in a second state, the light valve area comprising a layer of electro-optical material disposed between a first electrode layer and a second electrode layer, the first and second electrode layer configured to apply an electric field on the electro-optical material; and patterning at least one of the first and second electrode layers such that when the light valve is operated in the first state, a first section of the light valve area is clear while the light valve area outside the first section is opaque so as to allow only a part of the light beam to reach the image sensor through the first section to form a first image on the image sensor, and when the light valve is operated in a second state, a different second section of the light valve area is clear while the light valve area outside the second section is opaque so as to allow a different part of the light beam to reach the image sensor to form a second image.

The present invention will become transparent upon reading the description taken in conjunction with FIGS. 2A-11.

BRIEF DESCRIPTION OF THE DRAWINGS

FIGS. 7A-7C show a sequence of pictures taken by the single-lens camera in a different orientation, according to the present invention.

FIG. 7D shows a sequence of pictures taken by a single-lens camera having a light valve with four or more clearable sections.

DETAILED DESCRIPTION OF THE INVENTION

Figure 1:
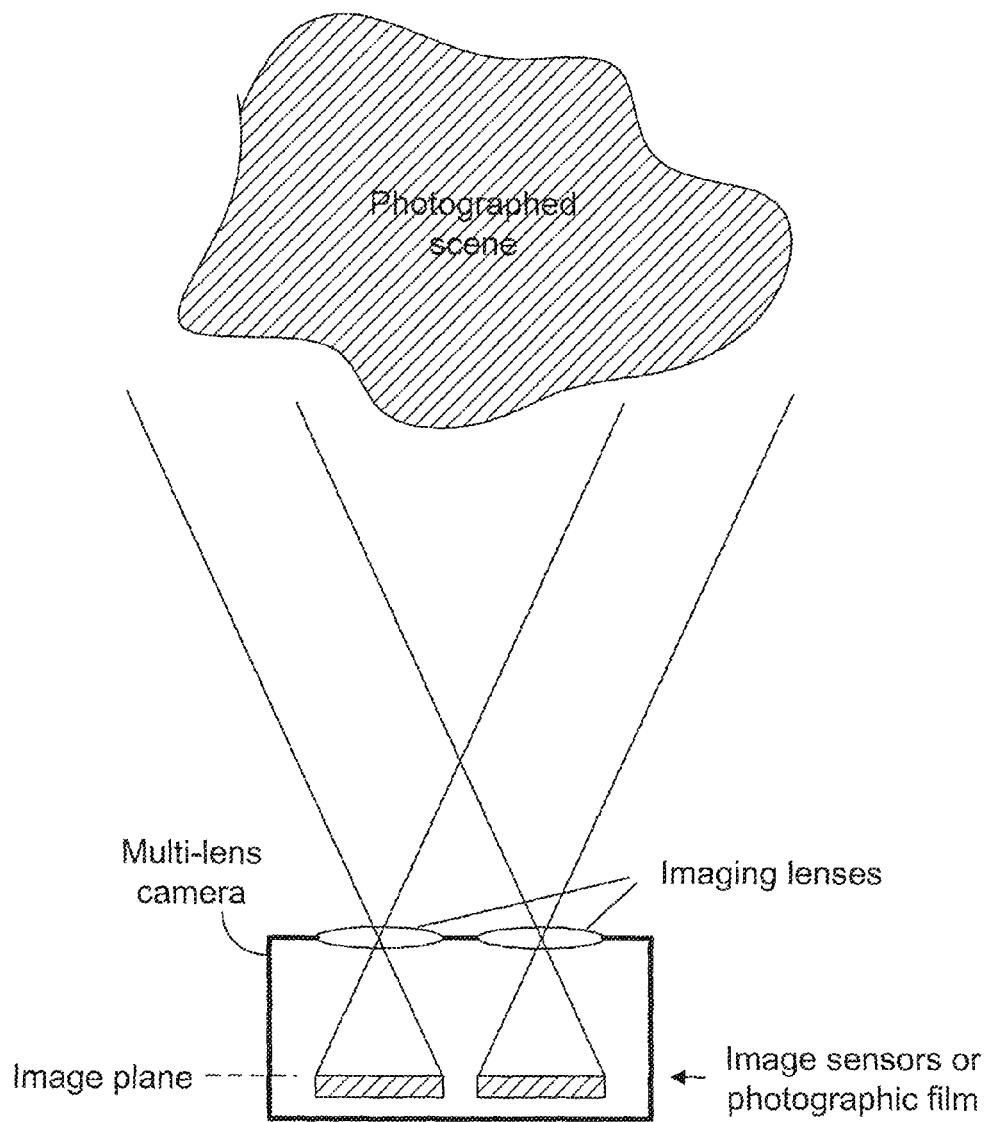
FIG. 1 shows a prior art dual-lens camera.
Figure 2A:
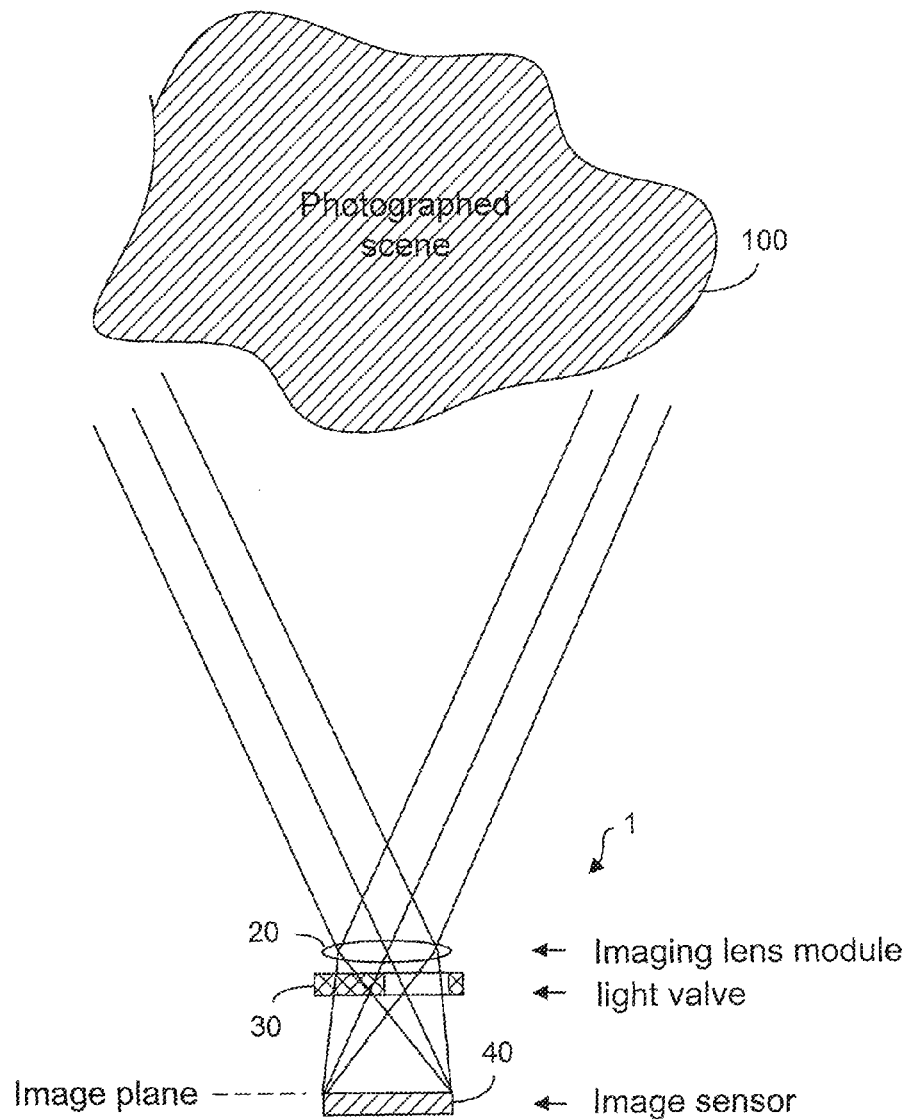
FIGS. 2A-2C are schematic representations showing a single-lens camera, according to various embodiments of the present invention.
Figure 2B:
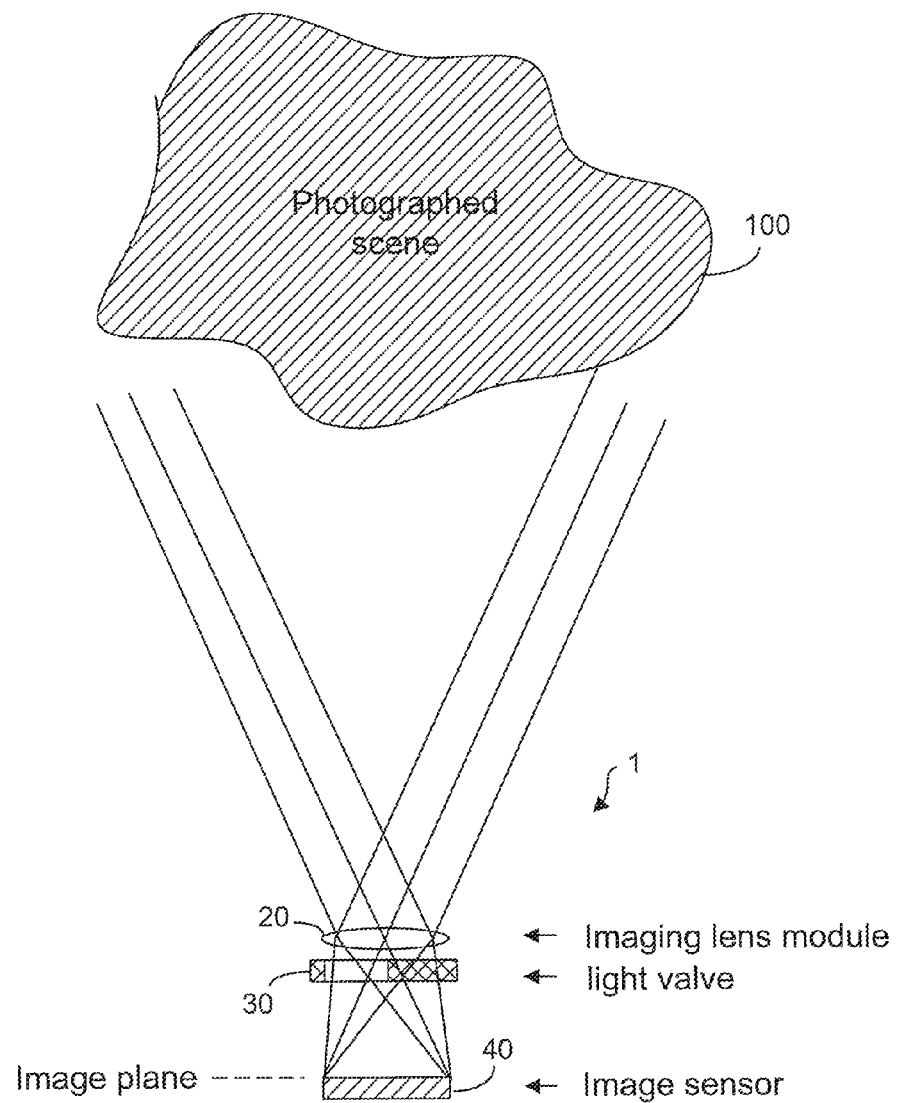
Figure 2C:
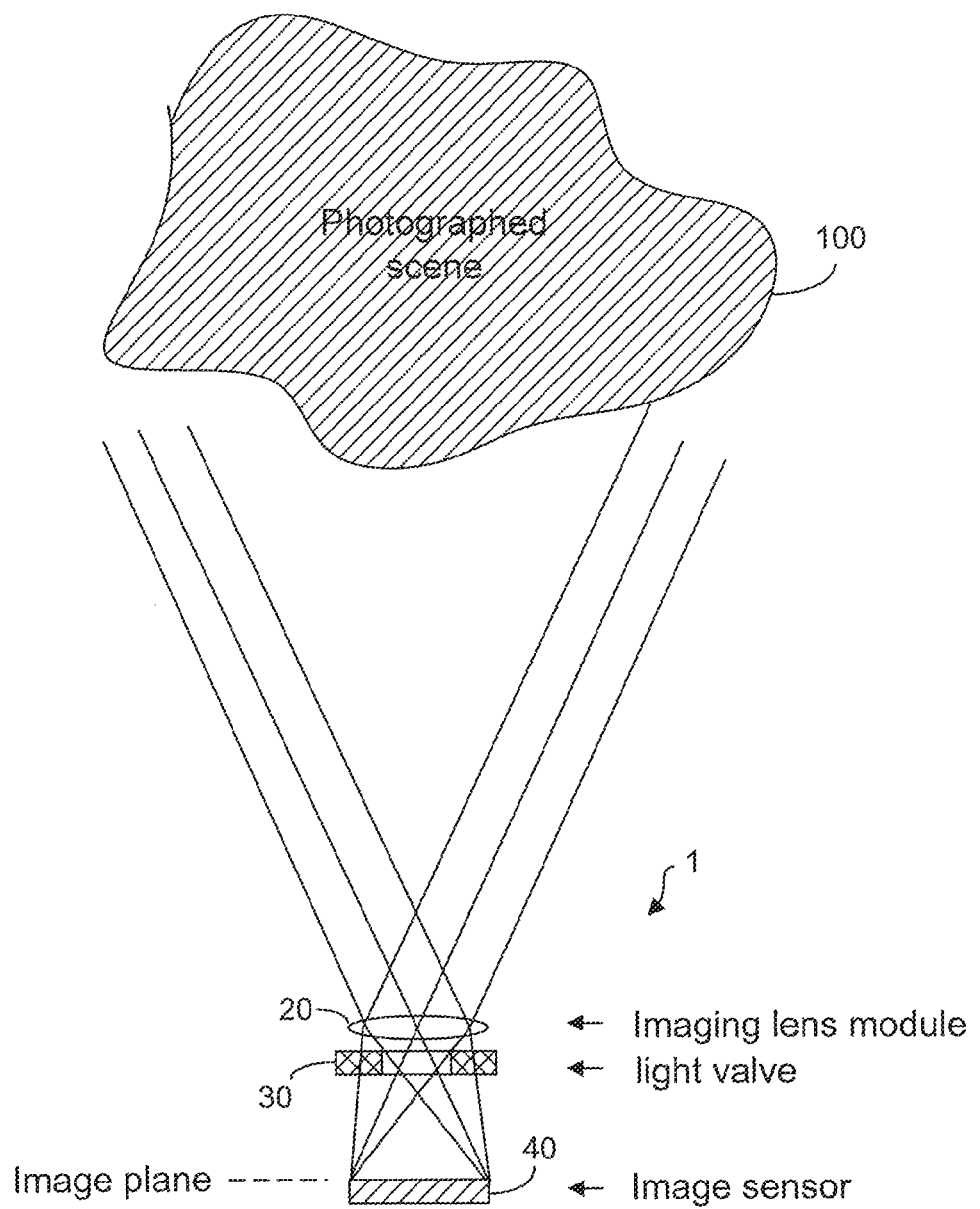
Figure 3:
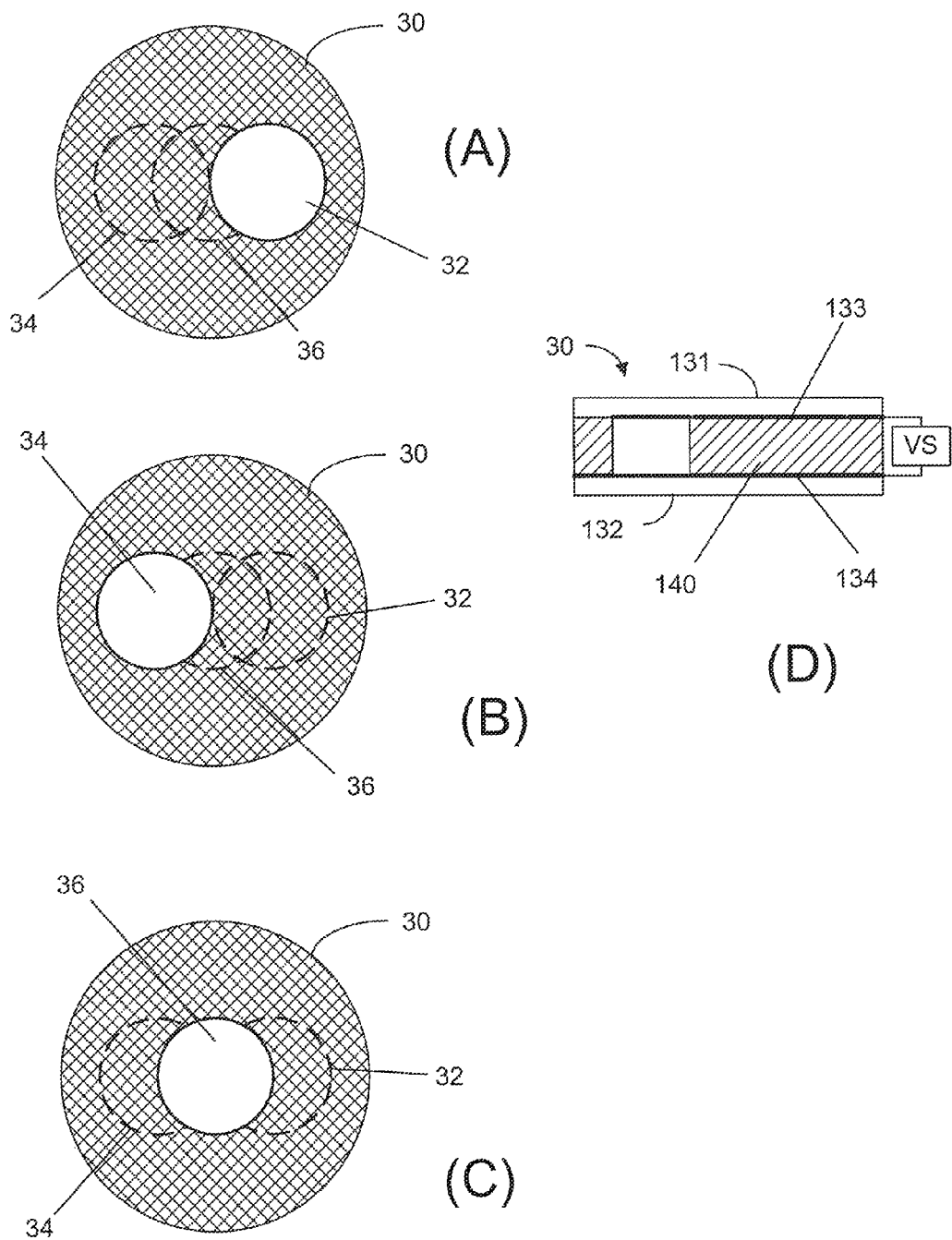
FIGS. 3A-3C show the arrangement of clearable areas in a light valve, according to one embodiment of the present invention.
FIG. 3D shows the basic construction of the light valve.

The present invention uses one lens module to take pictures of a scene at two or more vantage points. As shown in FIGS. 2A to 2C, the camera 1 of the present invention has one imaging lens module 20 for forming an image of a photographic scene 100 on an image sensor 40, which is located at the image plane or focal plane of the imaging lens module 20. Camera 1 also has a light valve 30 to control the incoming light. As shown in FIGS. 3A-3C, the light valve 30 is programmed or patterned to form a clear or transparent section at different locations in the light valve area of the light valve 30. For example, the clear section can be located on the right section of the light valve 30 as shown in FIG. 2A. The clear section can be located on the left section of the light valve 30 as shown in FIG. 2B or on the middle section of the light valve 30 as shown in FIG. 2C. As such, light countering the light valve 30 via the imaging lens module 20 is partially blocked off by the light valve 30. Only the light beam going through the clear or transparent section can reach the image sensor 40 and forms an image thereon. Pictures separately acquired or taken at different clear or transparent locations can be used to form a composite image for 3D display, for example.

FIGS. 3A-3C shows the arrangement of clearable sections in a light valve, according to one embodiment of the present invention. In the light valve 30 as shown in FIGS. 3A-3C, there are three overlapping sections 32, 34 and 36 within the light valve area that can be made clear separately. The section 32 is located on the right side, the section 34 is located in the left side and the section 36 is located in the middle part of the light valve area. In FIG. 3A, the right section 32 is made clear while the area outside the clear section 32 is opaque. As such, only part of the light beam through the imaging lens module 20 and the clear section 32 can reach the image sensor to form an image (see FIG. 2A). In FIG. 3B, the left section 34 is made clear while the area outside the clear section 34 is opaque. As such, only part of the light beam through the imaging lens module 20 and the clear section 34 can reach the image sensor to form an image (see FIG. 2B). In FIG. 3C, the middle section 36 is made clear while the area outside the clear section 36 is opaque. As such, only part of the light beam through the imaging lens module 20 and the clear section 36 can reach the image sensor to form an image (see FIG. 2C). The sections 32, 34 and 36 are referred to as clearable sections as they can be separately made clear or transparent to admit light. Each clearable section is an optically changeable section, operable in a clear state for allowing light to pass through and in an opaque or obscure state for preventing light from passing through. In regular camera applications, only one clearable section is in the clear state such that the remaining area of the light valve is opaque.

The light valve 30 can be constructed as having a layer of electro-optical material 140 disposed between two transparent substrates 131, 132 as shown in FIG. 3D. The light valve 30 also has two transparent electrode layers 133, 134 separately disposed on the two substrates. One or both electrode layers are patterned such that when a voltage source (VS) is used to apply an electric field to the electro-optical material 140 via the electrode layers, only one of the sections 32, 34, 36 becomes clear or transparent to admit light. The electrode layers 133, 134 can be made of indium tin oxide (ITO), for example.

Figure 4:
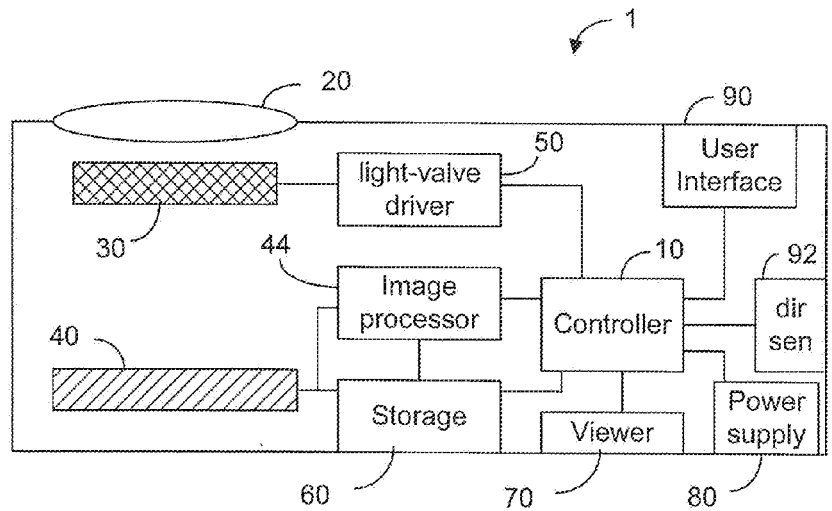
FIG. 4 shows a block diagram of the single-lens camera, according to the present invention.
Figure 5:
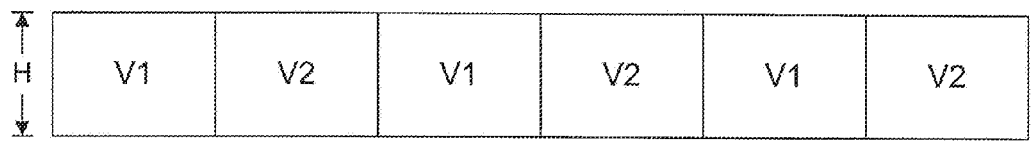
FIGS. 5A-5C show a sequence of pictures taken by the single-lens camera, according to the present invention.
Figure 5:
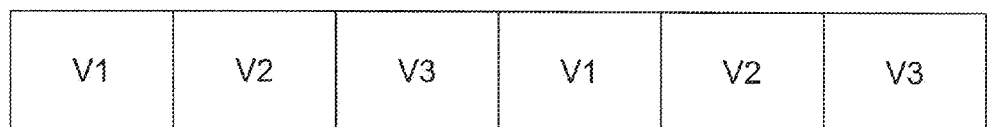
Figure 5:

The camera 1, according to one embodiment of the present invention, also comprises a storage module 60 for storing the images formed on the image sensor 40. The storage module 60 may comprise a built-in memory unit and/or a removable memory unit. Camera 1 comprises a light-valve driver 50 configured to apply a voltage on the electrodes 133, 134 of the light valve 30 for controlling the electro-optical material layer 140 (see FIG. 3D). As shown in FIG. 4, camera 1 comprises a controller 10 for controlling the various picture taking aspects of the camera. For example, the controller 10 is programmed to provide a timing signal to the light-valve driver 50 so that one of the light valve sections is in a clear state to admit light. At the same time, the timing signal also causes the electrical signal indicative of the image formed on the image sensor 40 to be read out and stored in the storage module 60. Camera 1 comprises an image processing module 44 so that the images in the storage module can be processed before or after being stored. However, the images stored in the storage module can also be raw images. A user interface 90 allows a user to select various picture taking modes. The user interface 50 may have a mechanical switch or a soft switch on a display for picture taking mode selection. The user interface 50 may have a release button to start the picture taking process. The picture taking modes comprise at least a single-shot mode for taking a regular 2D picture, a single group mode for taking one group of pictures at different viewing angles, a 2D sequence mode for taking two or more 2D pictures in a sequence, and a 3D sequence mode to take a series of pictures at different viewing angles. For example, when the user selects a single-shot mode, it is preferable that the middle light-valve section 36 is made clear, in response to a timing signal provided by the controller, so that a single picture is acquired and stored in the storage module 60. Likewise, when taking pictures with the 2D sequence mode, the middle light-valve section 36 is made clear so that a series of 2D pictures can be captured (see FIGS. 2C and 5C). When the user selects the single group mode, it is preferable that the side sections 32 and 34 are sequentially made clear to take a pair of pictures at two different views sequentially, or three sections 32, 36, 34 are sequentially made clear to take three pictures at three different views sequentially. When taking a series of right-left pictures (3D sequence mode), the left section 32, and the left section 34 are sequentially and alternately made clear (see FIGS. 2A, 2B and 5A). Alternately, the middle section 36 is also used to take the middle pictures as shown in FIG. 5B. Camera 1 also has a viewer 70 to allow the user to see the photographed scene and a battery compartment 80 as a power supply. When the image formed on the image sensor 40 is rectangular in shape such that the image width (W) is greater than the image height (H), the user usually takes pictures in the regular horizontal mode so that the image series would be similar to those shown in FIGS. 5A-5C. FIG. 5A shows a sequence of images representing right, left views alternately captured and stored, where V1 and V2 denote images of two different views alternately formed through the alternately occurred clear sections 32 and 34. It is possible to use the middle section 36, along with the right-left sections 32, 34, to take a series of images in three different views. FIG. 5B shows a sequence of images representing right, middle, left views sequentially captured and stored, wherein V1, V2 and V3 denote images of three different views sequentially formed through the clear sections 32, 36, 34 sequentially made on the light valve 30. FIG. 5C shows a sequence of regular 2D pictures formed through one of the clear sections, preferably the middle section 36 of the light valve 30 for better image quality.

Figure 6:
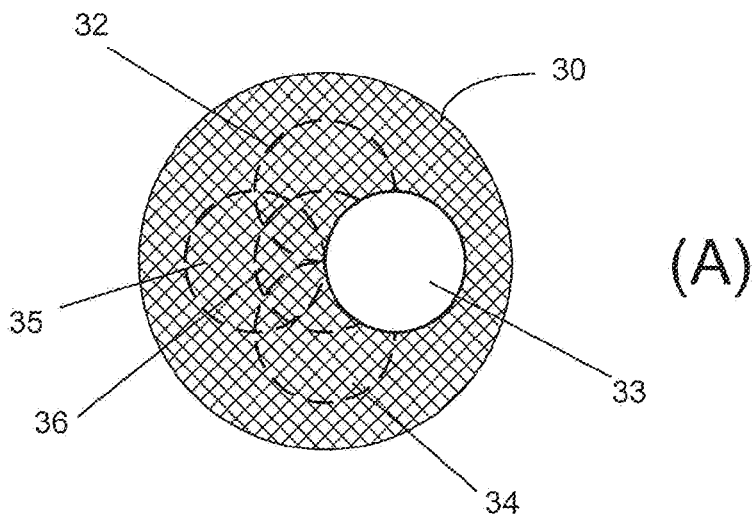
FIGS. 6A-6C show a different arrangement of the clearable sections in the light valve, according to another embodiment of the present invention.
Figure 6:
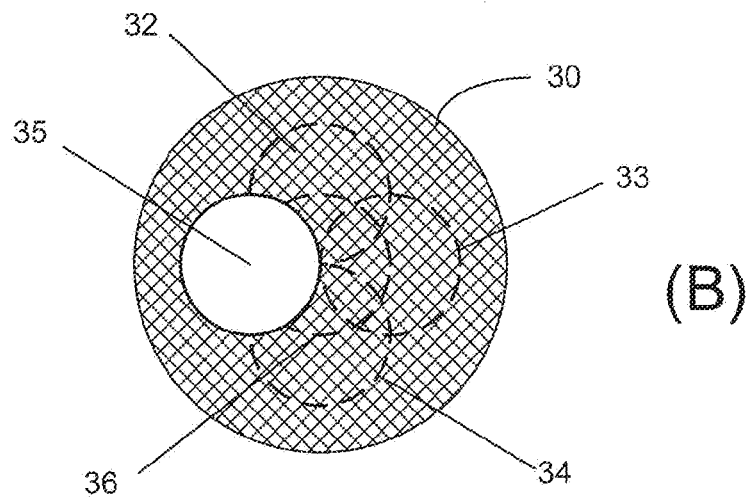
Figure 6:
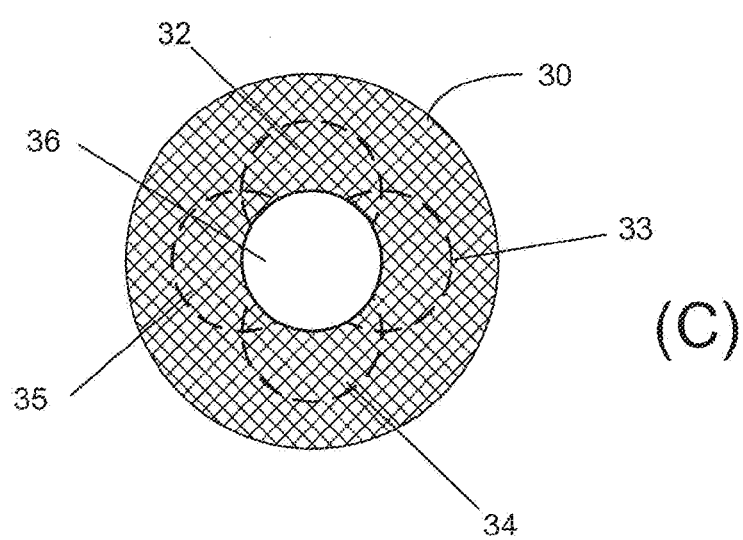

With the image formed on the image sensor 40 being rectangular in shape and the images being taken in the regular horizontal mode as shown in FIGS. 5A-5C, the right-left clearable sections 32, 34 in the light valve 30 are arranged along a direction substantially parallel to the image width or the horizontal axis. But when the user takes pictures in a different orientation, or the vertical mode, the right-left clearable sections must be arranged differently in order to produce the necessary parallax for a 3D image. According to another embodiment of the present invention, the light valve 30 is patterned to have two additional sections 33, 35 that can be made clear when the camera is used in the vertical mode. In FIG. 6A, the right section 33 is made clear while the area outside the clear section 32 is opaque. As such, only part of the light beam through the imaging lens module 20 and the clear section 32 can reach the image sensor to form an image, similar to the depiction in FIG. 2A. In FIG. 6B, the left section 35 is made clear while the area outside the clear section 35 is opaque. As such, only part of the light beam through the imaging lens module 20 and the clear section 35 can reach the image sensor to form an image, similar to the depiction in FIG. 2B. In FIG. 6C, the middle section 36 is made clear while the area outside the clear section 36 is opaque. As such, only part of the light beam through the imaging lens module 20 and the clear section 36 can reach the image sensor to form an image (see FIG. 2C).

According to one embodiment of the present invention, camera 1 also comprises an orientation sensing device 92 to sense whether the camera is used in a horizontal mode on in a vertical mode so that the proper clearable sections 32, 33, 34, 35, 36 will be selected.

Figure 7:
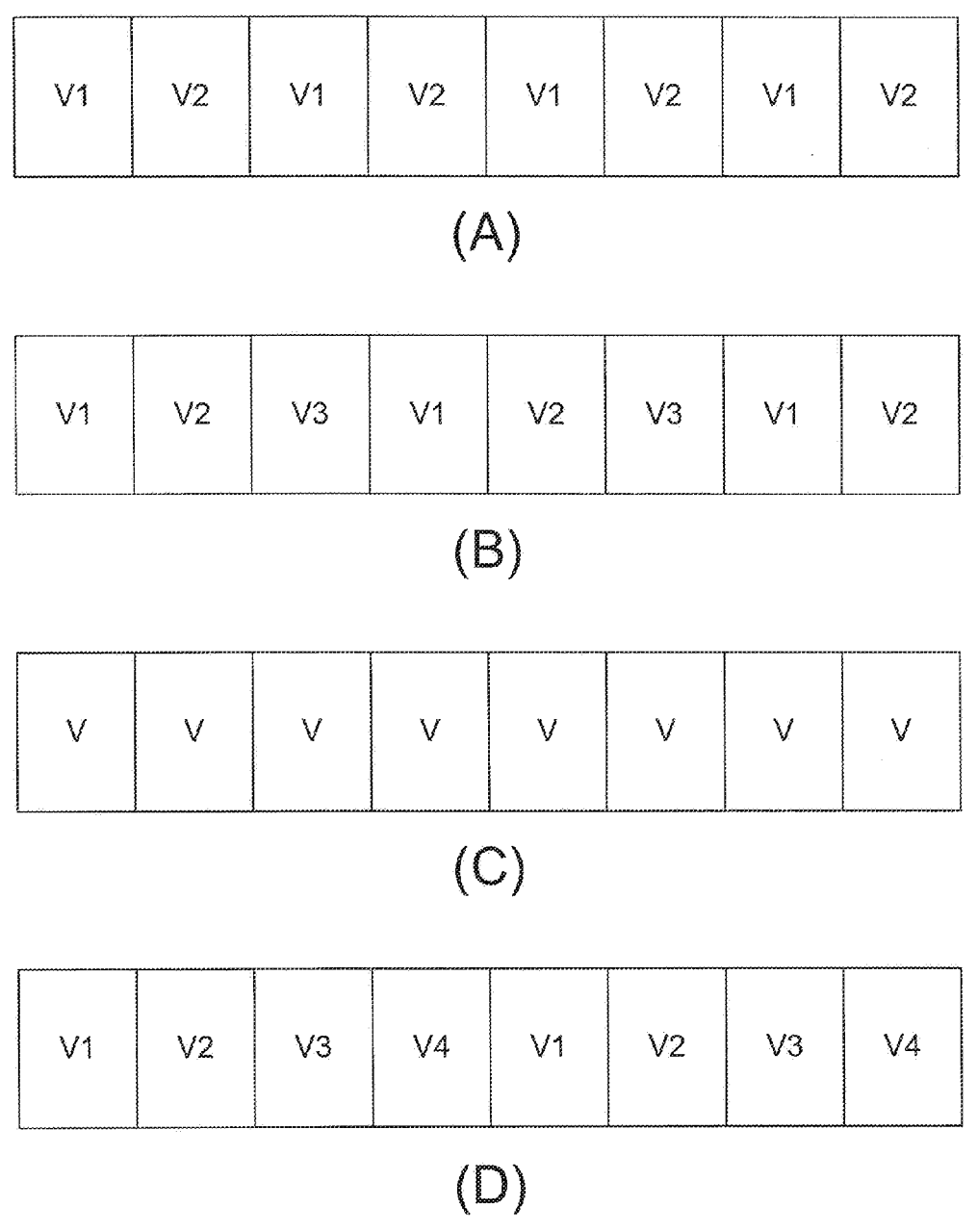

The pictures taken in the vertical mode are shown in FIGS. 7A-7D. FIG. 7A shows a sequence of images representing right, left views alternately captured and stored, where V1 and V2 denote images of two different views alternately formed through the alternately occurred clear sections 33 and 35. It is possible to use the middle section 36, along with the left-right sections 33, 35, to take a series of images in three different views. FIG. 7B shows a sequence of images representing right, middle, left views sequentially captured and stored, wherein V1, V2 and V3 denote images of three different views sequentially formed through the clear sections 33, 36, 35 sequentially made on the light valve 30. FIG. 7C shows a sequence of regular 2D pictures formed through one of the clear sections, preferably the middle section 36 of the light valve 30 for better image quality.

Figure 9:
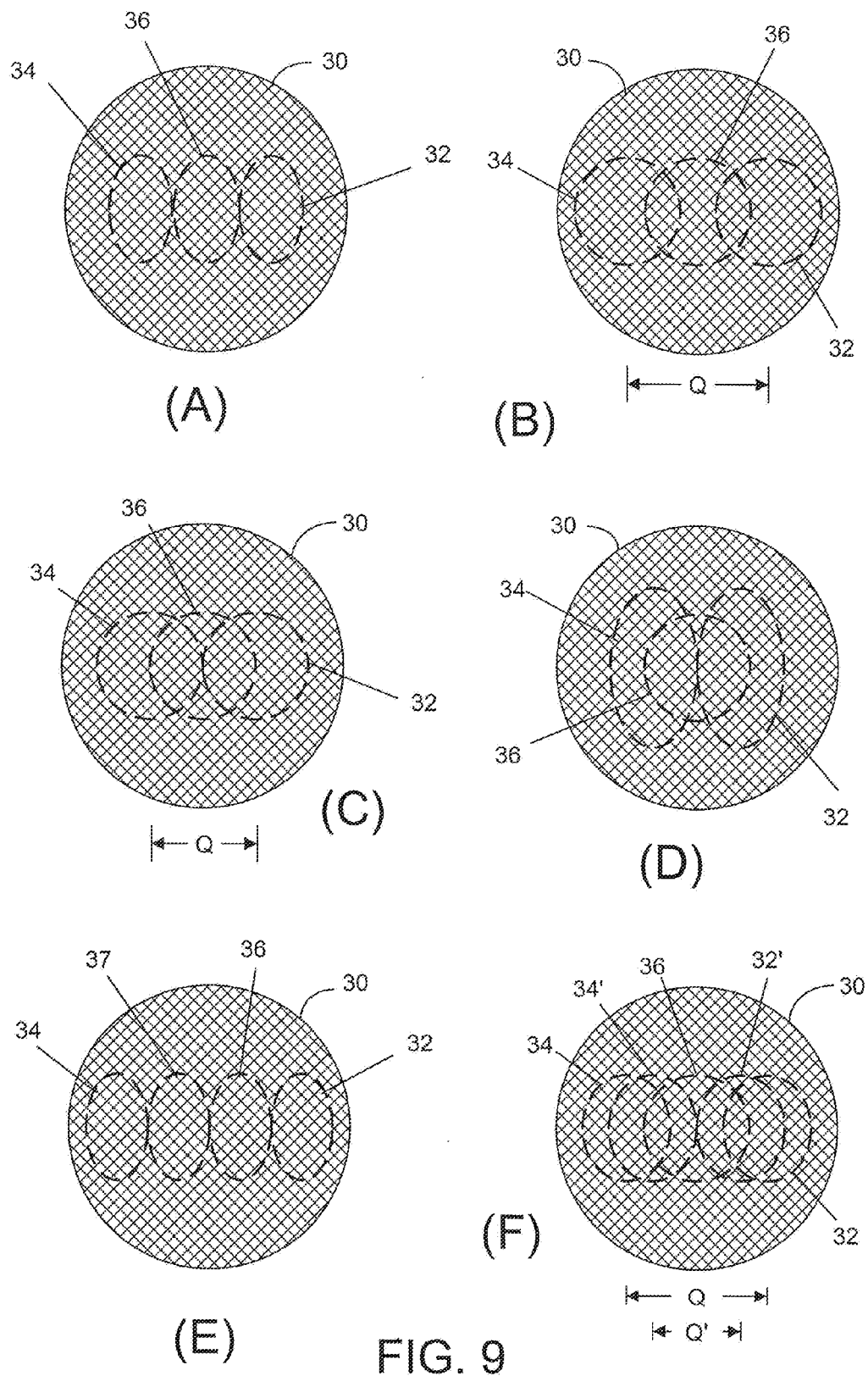
FIGS. 9A-9D show different arrangements of three clearable sections in the light valve, according to the present invention.
FIG. 9E shows the arrangement of four clearable sections in the light valve, according to the present invention.
FIG. 9F shows a light valve having adjustable clearable sections.

It should be noted that the number of different views can be two, three, four or more (see FIG. 9E, for example). With the light valve patterned to have four sections that can be made clear in a sequential manner and the four sections are arranged linearly along a direction, such as the direction parallel to the width of the images (see FIG. 5A, for example), a user can take a series of images representing four different views sequentially captured and stored. As shown in FIG. 7D, V1, v2, V3, V4 denote images of four different views sequentially formed through four sections sequentially made clear on the light valve.

Figure 8:
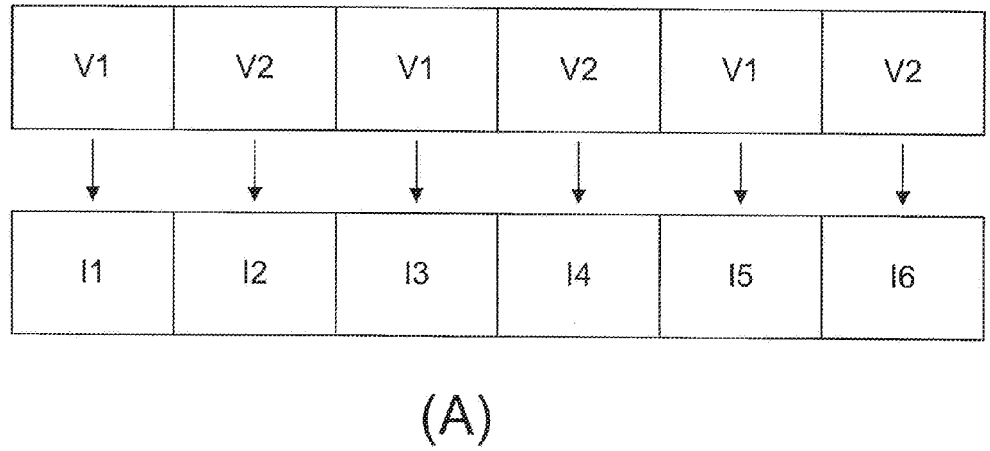
FIG. 8A shows a sequence of displayed 2D images using the sequence of pictures taken by the single-lens camera, according to the present invention.
FIG. 8B shows a sequence of displayed composite images using the sequence of pictures taken by the single-lens camera, according to the present invention.
Figure 8:
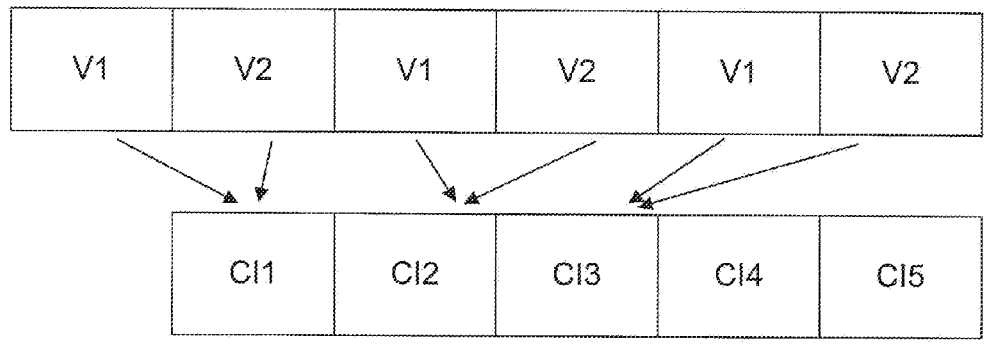

With a series of images representing two different views V1 and V2 alternately captured as shown in FIGS. 5A and 7A, the captured images can be used for showing a 3D video or movie in two ways. As shown in FIG. 8A, the captured images can be shown as displayed images I1, I2, I3, . . . in the same sequence. In order to see the 3D effect, a viewer is required to wear a pair of special glasses that alternately open and close to see the displayed right and left views. Currently, other 3D presentation techniques such as polarization separation and red/cyan anaglyphic lenses are also used.

Alternately, each pair of two different views V1 and V2 can be combined into a composite image CI1, CI2, . . . as shown in FIG. 8B. The composite image series CI1, CI2, . . . can be sequentially shown on a display panel and a parallax separation device is placed in front of the composite image to separate and present the different views to a viewer's eyes. The parallax separation device can be a lenticular screen or a parallax barrier panel.

It should be understood that a light valve having two or more sections that can be made clear or transparent can be configured differently. For example, the sections can be non-overlapping as shown in FIG. 9A. The sections can be slightly overlapping as shown in FIG. 9B or more overlapping as shown in FIG. 9C. In FIGS. 9B and 9C, Q is the distance between the clearable sections 32, 34. Furthermore, the shape of the sections can be different as shown in FIG. 9D. Furthermore, the light valve 30 can have four sections 32, 36, 37, 34 that can be made clear or transparent in a sequential manner as shown in FIG. 9E. In general, the number of optically changeable sections is determined by the useful aperture of the imaging lens module. Thus, the number of optically changeable sections can be two, three, four or more.

The 3D effect of a 3D display relies on the amount of parallax as perceived in the viewer's eyes. If the amount of parallax is small, the scene on the 3D display would appear flat, like a 2D picture. If the amount of parallax is too great, the viewer might not be able to perceive a well-focused 3D scene. The amount of parallax, in general, is controlled by two factors. The first factor controlling the parallax is the distance between the clear sections in the light valve of the camera. The second factor is the inter-distance between the photographed subjects in a scene. For example, if one takes a picture of a distance mountain without foreground, the amount of parallax would be very small. If one also includes a few nearby trees as foreground and the distance between the mountain and the camera is too great as compared to the distance between the trees and the camera, excessive amount of parallax might result.

Let us denote the amount of parallax on the image sensor as P, the distance between the two clear sections used in taking pictures as Q (see FIG. 11), the image forming distance in the camera of the main subject is S and the image forming distance of the foreground is S', then the parallax is approximately given by $$P(S'-S)=QS'$$

Likewise, if the image forming distance of the background is S", then the parallax of the background is approximately given by $$P'(S-S")=QS"$$

When the pictures are made into a display, the parallax mount on the display as perceived by a viewer is magnified by the magnification factor. By knowing the magnification factor and the estimated distance at which a viewer sees the display, it is possible to determine a range of parallax values where a 3D display would produce a reasonably good 3D effect. In general, if the inter-distance between the photographed subjects is great, a smaller Q should be used. Otherwise a default Q should be used. Thus, it is advantageous to use a light valve in which the inter-distance between the clear sections used for taking pictures can be adjusted.

According to one embodiment of the present invention, the light valve 30 is configured or otherwise patterned to provide more than one Q value, as shown in FIG. 9F. For example, it is possible to have one pair of clearable sections 32, 34 for providing the "default" Q value, and another pair of clearable sections 32', 34' for providing a smaller Q'. The selection of Q values can be done using the user interface 90 (see FIG. 4), for example. It should be noted that it is possible to have more than two pairs of clearable sections so that the inter-distance Q can be adjusted in small steps.

Figure 10:
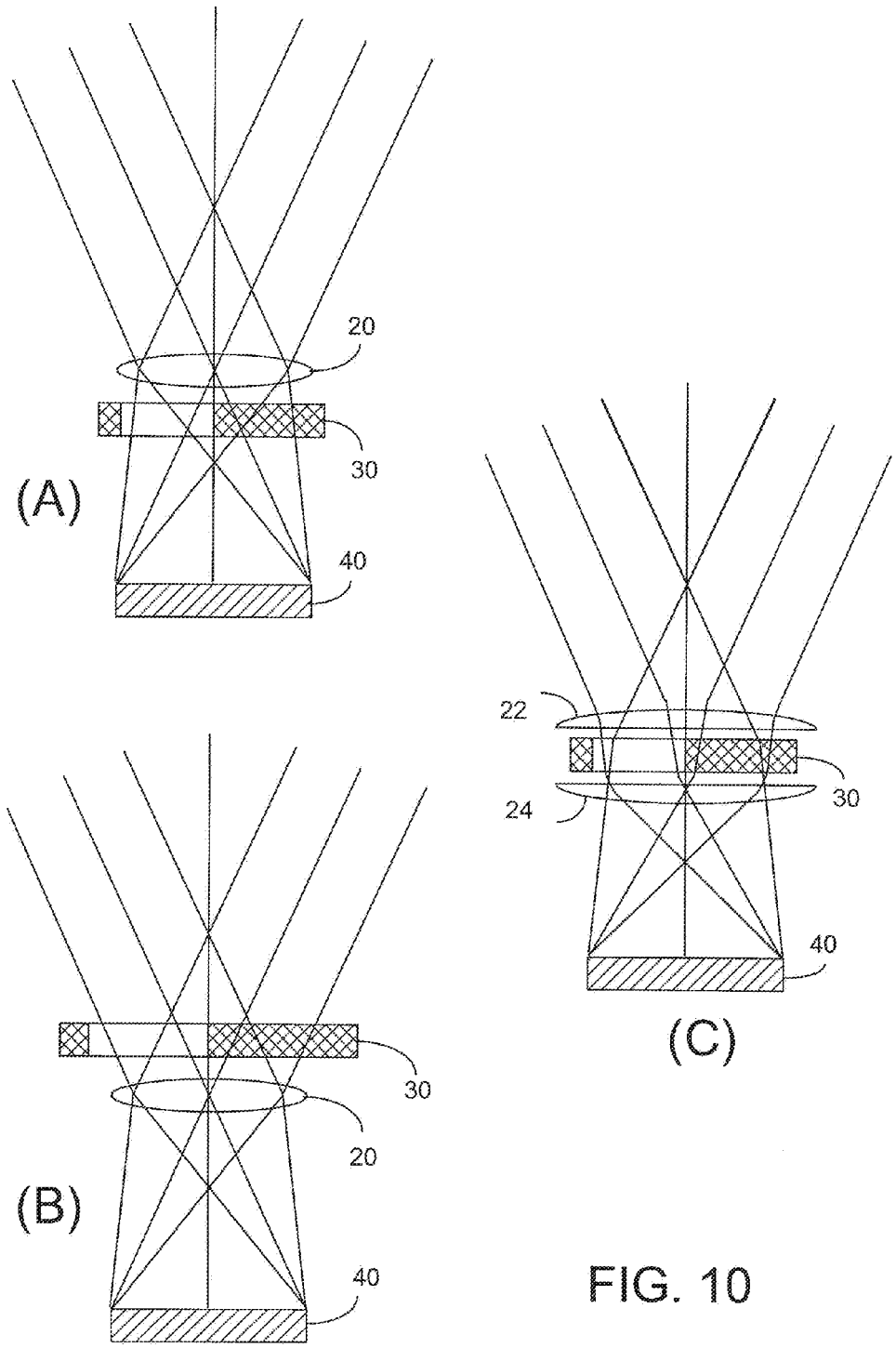
FIGS. 10A-10C show different arrangements of light valve in relationship to the imaging lens module.

The light valve 30, according to various embodiments of the present invention, can be placed at different positions relative to the imaging lens module 20 and the image sensor 40. The light valve 30 can be positioned between the imaging lens module 20 and the image sensor 40 as shown in FIG. 10A. The light valve 30 can be placed in front of the imaging lens module 20, further away from the image sensor 40, as shown in FIG. 10B. In an imaging lens module that has two sub-modules 22, 24 with a gap therebetween, it is possible to place the light valve 30 between the two sub-modules 22 and 24 as shown in FIG. 10C.

The light valve 30, according to the present invention, can be a solid state light valve, or a light valve having a liquid electro-optical material layer 140. The liquid electro-optical material layer 140 can be a layer of liquid crystal molecules.

Figure 11:
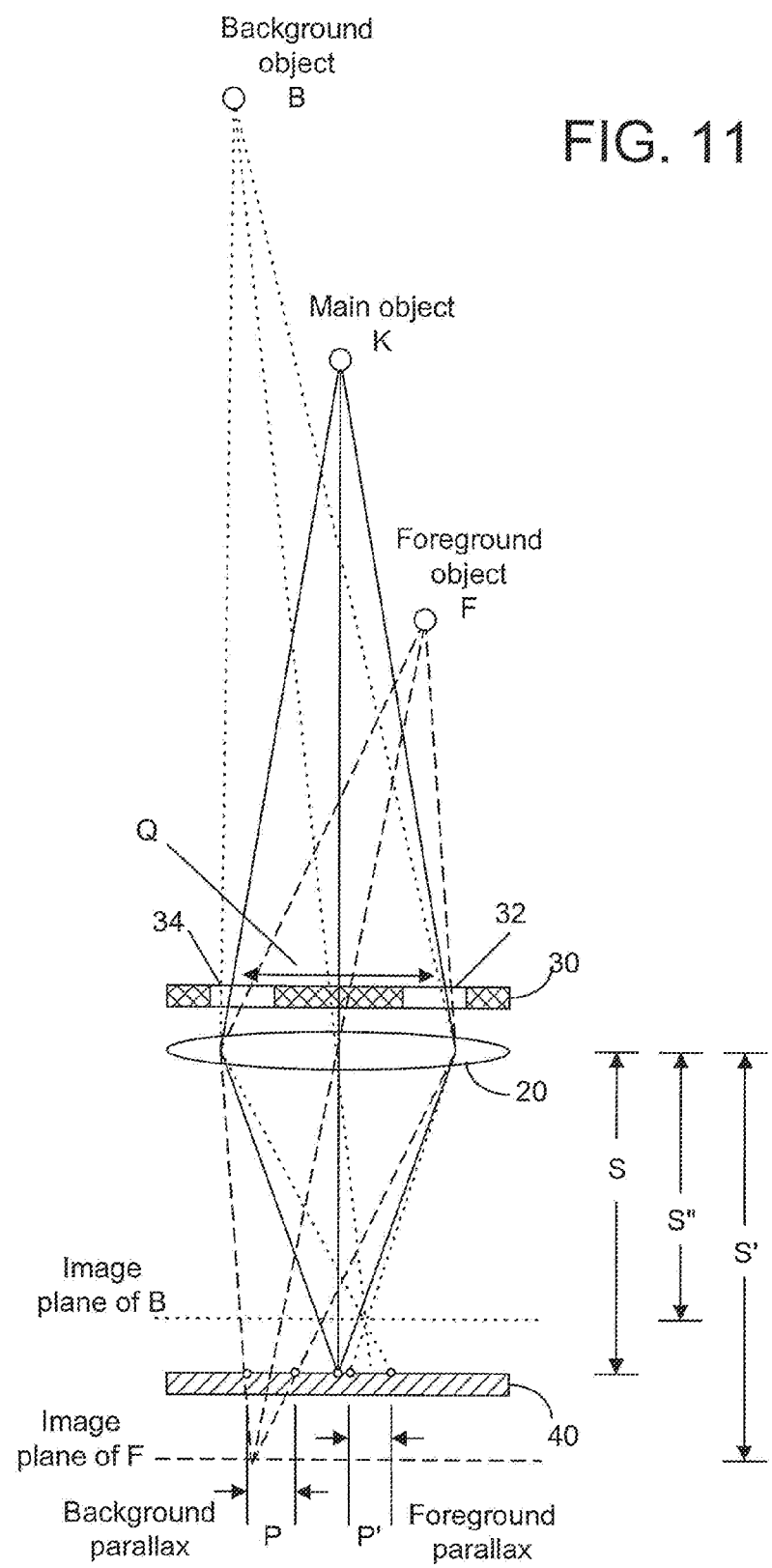
FIG. 11 shows the parallax on the image sensor.

FIG. 11 shows the amount of parallax on the image sensor 30. As shown in FIG. 11, the photographed scene has three photographed objects: main object K, background object B and foreground object F. S is the image forming distance of the main object K. Because the image plane of the background object is closer to the camera lens than the image plane of the main object, the image forming distance S" of the background object is smaller than S. Because the image plane of the foreground object is farther than the image plane of the main object, the image forming distance S' of the foreground object is greater than S. When taking a 3D picture, a camera user should avoid having an excessive amount of parallax or having too small amount of parallax. Thus, it is advantageous that the distance Q is adjustable or selectable.

In summary, the present invention provides a 2D/3D camera which can be used to take regular 2D pictures and pictures for use in 3D pictures or 3D displays. The present invention places a light valve in relationship to a lens module to control the light beam received by the lens module for forming an image on an image sensor. The light valve has a light valve area positioned in a path of the light beam. The light valve has two or more clearable sections such that only one section is made clear to allow part of the light beam to pass through. By separately making clear different sections on the light valve, a number of images as viewed through slightly different angles can be captured. The clearable sections include a right section and a left section so that the captured images can be used to produce 3D pictures or displays. The clearable sections also include a middle section so that the camera can be used as a 2D camera.

In particular, the light valve area has a layer of electro-optical material disposed between a first electrode layer and a second electrode layer, the first and second electrode layer configured to apply an electric field on the electro-optical material, wherein at least one of the first and second electrode layers is patterned such that when the light valve is operated in the first state, a first section of the light valve area is clear while the light valve area outside the first section is opaque so as to allow only a part of the light beam to reach the image sensor through the first section to form a first image on the image sensor, and when the light valve is operated in a second state, a different second section of the light valve area is clear while the light valve area outside the second section is opaque so as to allow a different part of the light beam to reach the image sensor to form a second image.

The light valve is configured to operate in the first state and the second state in an alternate fashion in a time cycle and the image sensor is configured for providing the electrical signal to the storage device in the time cycle so as to allow the storage device to record a series of recorded images representative of the first and second images in the alternate fashion.

The light valve is further operable in a third state, and said at least one of the first and second electrode layers is patterned such that when the light valve is operated in the third state, a third section of the light valve area is clear while the light area outside the third section is opaque so as to allow only a part of the light beam to reach the image sensor through the third section to form a third image on the image sensor, the third section located between the first section and the second section. The light valve can be made of a liquid crystal material, for example.

The camera can be used to take a single 2D picture, or a single group of pictures at slightly different angles so that the group pictures can be used to make a 3D picture or a 3D display. The camera can also be used as a video camera to take a series of 2D pictures or a series of right-left pictures.

According to one embodiment of the present invention, the clearable sections that are used to take right-left pictures have an adjustable inter-section distance.

If the sensor is configured to produce rectangular images defined by image height and image width greater than the image height, and the camera is operable in a first picture taking mode for taking pictures such that the image width is substantially along a horizontal axis, the clearable sections on the light valve area are arranged in a direction substantially parallel to the image width; and a second picture taking mode for taking pictures such that the image width is substantially along a vertical axis, the clearable sections on the light valve area are arranged in a direction substantially parallel to the image height.

The light valve can be placed in front of the imaging lens module, behind the imaging lens module, or within the lens module.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A camera comprising:
   a lens module having a focal plane and an optical axis, the lens module configured for receiving an incoming light beam for forming an image at the focal plane;
   an image sensor located substantially at the focal plane for sensing the image, the image sensor configured for providing electrical signal indicative of the image to a storage device; and
   a light valve located in a fixed relationship to the lens module in reference to the optical axis, the light valve comprising a valve area positioned in a path of the light beam, wherein the light valve is operable at least in a first state and in a second state, the light valve area comprising at least three different sections, including a first section, a second section and a third section, the light valve area comprising a layer of electro-optical material disposed between a first electrode layer and a second electrode layer, the first and second electrode layer configured to apply an electric field on the electro-optical material, wherein at least one of the first and second electrode layers is patterned such that when the light valve is operated in the first state, the first section of the light valve area is clear while the light valve area outside the first section is opaque so as to allow only a part of the light beam to reach the image sensor through the first section to form a first image on the image sensor, and when the light valve is operated in a second state, any one of the second section and the third section of the light valve area is selectable to be clear while the light valve area outside said any one of the second section and the third section is opaque so as to allow a different part of the light beam to reach the image sensor to form a second image.

2. The camera according to claim 1, wherein the light valve is configured to operate in the first state and the second state in an alternate fashion in a time cycle and the image sensor is configured for providing the electrical signal to the storage device in the time cycle so as to allow the storage device to record a series of recorded images representative of the first and second images in the alternate fashion.

3. The camera according to claim 1, wherein said at least one of the first and second electrode layers is patterned such that the third section located between the first section and the second section.

4. The camera according to claim 1, wherein the third section and the first section are partially overlapped and the third section and the second section are also partially overlapped.

5. The camera according to claim 1, further comprising:
   a controller for providing a timing signal; and
   a light-valve driver, responsive to the timing signal, for applying the electric field on the electro-optical material, the image sensor providing the electrical signal also based on the timing signal.

6. The camera according to claim 1, wherein said light valve comprises a liquid crystal device and the electro-optical material comprises a layer of liquid crystal molecules.

7. The camera according to claim 1, wherein the light valve is located between the lens module and the image sensor.

8. The camera according to claim 1, wherein the lens module has a first module end and an opposing second module end facing the image sensor, and wherein the light valve is located outside the lens module near the first module end further away from the second module end.

9. The camera according to claim 1, wherein the lens module comprises a first lens sub-module and a second lens sub-module along an optical axis spaced from the first lens sub-module, and wherein the light valve is located between the first lens sub-module and the second lens sub-module.

10. The camera according to claim 1, wherein the light valve is configured to operate in the first state and the second state in an alternate fashion in a time cycle and the image sensor is configured for providing the electrical signal to the storage device in the time cycle so as to allow the storage device to record a series of recorded images representative of the first and second images in the alternate fashion in a video mode, and wherein the light valve is further operable in a third state, and said at least one of the first and second electrode layers is patterned such that when the light valve is operated in the third state, a third section of the light valve area is clear while the light area outside the third section is opaque so as to allow only a part of the light beam to reach the image sensor through the third section to form a third image on the image sensor in a single-shot mode, the third section located between the first section and the second section, said camera further comprising:
   a user interface for allowing a user to choose between the video mode or the single-shot mode.

11. The camera according to claim 10, wherein the image is rectangular defined by image height and image width greater than the image height, and wherein the camera is operable
   in a first picture taking mode for taking pictures such that the image width is substantially along a horizontal axis, the first section and the second section of the light valve area are arranged in a direction substantially parallel to the image width; and
   a second picture taking mode for taking pictures such that the image width is substantially along a vertical axis, the first section and the second section of the light valve area are arranged in a direction substantially parallel to the image height.

12. The camera according to claim 1, wherein the first section and the second section define an inter-section distance, and wherein the inter-section distance is adjustable.

13. A method for use in a camera, the camera comprising
a lens module having a focal plane, the lens module configured for receiving an incoming light beam for forming an image at the focal plane; and
an image sensor located substantially at the focal plane for sensing the image, the image sensor configured for providing electrical signal indicative of the image to a storage device, said method comprising:
disposing a light valve located in a fixed relationship to the lens module, the light valve comprising a valve area positioned in a path of the light beam, wherein the light valve is operable at least in a first state and in a second state, the light valve area comprising a layer of electro-optical material disposed between a first electrode layer and a second electrode layer, the first and second electrode layer configured to apply an electric field on the electro-optical material; and
patterning at least one of the first and second electrode layers such that the light area comprises at least three different sections and that when the light valve is operated in the first state, the first section of the light valve area is clear while the light valve area outside the first section is opaque so as to allow only a part of the light beam to reach the image sensor through the first section to form a first image on the image sensor, and when the light valve is operated in a second state, any one of the second section and the third section of the light valve area is selectable to be clear while the light valve area outside said any one of second section and third section is opaque so as to allow a different part of the light beam to reach the image sensor to form a second image.

14. The method according to claim 13, wherein the light valve is configured to operate in the first state and the second state in an alternate fashion in a time cycle and the image sensor is configured for providing the electrical signal to the storage device in the time cycle so as to allow the storage device to record a series of recorded images representative of the first and second images in the alternate fashion.

15. The method according to claim 13, wherein the third section and the first section are partially overlapped and the third section and the second section are also partially overlapped.

16. The method according to claim 13, wherein said at least one of the first and second electrode layers is patterned such that the third section located between the first section and the second section.

17. The method according to claim 13, wherein the light valve is disposed between the lens module and the image sensor.

18. The method according to claim 13, wherein the lens module has a first module end and an opposing second module end facing the image sensor, and wherein the light valve is disposed outside the lens module near the first module end further away from the second module end.

19. The method according to claim 13, wherein the lens module comprises a first lens sub-module and a second lens sub-module along an optical axis spaced from the first lens sub-module, and wherein the light valve is disposed between the first lens sub-module and the second lens sub-module.

20. The method according to claim 13, wherein the first section and the second section define an inter-section distance, and wherein the inter-section distance is adjustable.

* * * * *